United States Patent [19]

Nagy et al.

[11] Patent Number: 5,060,891

[45] Date of Patent: Oct. 29, 1991

[54] CONDUIT SUPPORT BRACKET

[76] Inventors: Dennis J. Nagy, 21200 E. Britton Rd., Harrah, Okla. 73045; Timothy J. McGraw, 2301 NW. 122nd St., Apt. 3508, Oklahoma City, Okla. 73120

[21] Appl. No.: 597,538

[22] Filed: Oct. 15, 1990

Related U.S. Application Data

[63] Continuation of Ser. No. 321,146, Mar. 9, 1989, abandoned.

[51] Int. Cl.⁵ .................................................. F16L 5/00
[52] U.S. Cl. ..................................... 248/56; 174/65 R; 248/70; 248/74.1
[58] Field of Search ....................... 248/70, 56, 57, 52, 248/49, 65, 74,1, 27.1, 27.3; 403/199, 266; 285/64, 61; 174/64, 65 R

[56] References Cited

U.S. PATENT DOCUMENTS

| | | | |
|---|---|---|---|
| 784,327 | 3/1905 | Hill | 285/64 X |
| 858,140 | 6/1907 | Beaton | 248/57 |
| 910,765 | 1/1909 | Adelman | 248/56 |
| 1,109,962 | 9/1914 | Chadwick | 248/56 |
| 1,248,207 | 11/1917 | Tyner | 248/56 X |
| 1,345,351 | 7/1920 | Crosby et al. | 248/52 X |
| 1,494,234 | 5/1924 | Gossett | 248/56 X |
| 1,709,898 | 4/1929 | Cunneen | 248/70 |
| 1,727,701 | 9/1929 | Elder, Jr. | 248/56 |
| 2,454,064 | 11/1948 | Johnson | 248/56 X |
| 2,546,766 | 3/1951 | McWilliams | 248/70 X |
| 4,259,542 | 3/1981 | Tehan et al. | 248/56 X |

FOREIGN PATENT DOCUMENTS

| | | | |
|---|---|---|---|
| 867503 | 3/1971 | Canada | 248/74.1 |
| 2516072 | 1/1976 | Fed. Rep. of Germany | 248/74.1 |

Primary Examiner—David L. Talbott

[57] ABSTRACT

A preformed conduit support bracket for supporting vertical raceways extending from electrical control cabinets of industrial machinery. The conduit support bracket comprises a mounting basae and stanchion post. The mounting base consisting of a flat plate with four mounting holes, and a larger center hole. The mounting holes allow for bolts and nuts to attach the mounting base to a control cabinet. The larger center hole allows for inserting a conduit connector through the machine control cabinet without interference from the mounting base. The center hole is sized and so positioned from the stanchion post to allow for proper alignment of both the conduit connector and a conduit hanger. The stanchion post perpendicular to the mounting plate provides a vertical means for securing conduit hangers. The stanchion post having a narrower upper portion and a slot which allows for securing various size of conduit hangers to the stanchion post to any point along its axis. To further rigidify and strengthen the conduit support bracket, the invention provides the stanchion post to be short in length and dove tailed formed.

14 Claims, 4 Drawing Sheets

CONDUIT SUPPORT BRACKET

REFERENCES TO RELATED APPLICATIONS

This application is a continuation of the application with Ser. No. 321,146 which was filed on 03/09/89, now abandoned.

BACKGROUND OF THE INVENTION

1. Field of the Invention

This invention relates in general to electrical raceway supports, and in particular to supports used for supporting vertical raceways extending from electrical control cabinets of industrial machinery.

2. Prior Art

Within the electrical field there exists requirements for electricians to install and support various diameters, types and quantities of vertical raceways to industrial machinery and associated electrical equipment.

These raceways serve as the primary enclosed channel for electrical conductors that provide electrical power to the machines and equipment. The various diameters of raceways mentioned above relate to, but not limited to the following trade sizes, $\frac{1}{2}''$, $\frac{3}{4}''$, $1''$, $1\frac{1}{4}''$, $1\frac{1}{2}''$, $2''$, $2\frac{1}{2}''$, $3''$, $3\frac{1}{2}$, and $4''$. The various types of raceways as mentioned above consist of, but not limited to rigid metal conduit, rigid nonmetallic conduit, intermediate metal conduit, liquid tight flexible conduit, flexible metal conduit, electrical nonmetallic tubing, and electrical metallic tubing.

The 1990 National Electrical Code requires all types of raceways regardless of diameter to be firmly supported after installation. To give the reader a better understanding of the art to follow, it is important for the reader to fully understand the requirements for supporting the various types of raceways as per the National Electrical Code 1990. The Code states "The following types of raceways shall be supported within three (3) feet of electrical control cabinets, rigid metal conduit, rigid nonmetallic conduit, intemediate metal conduit, electrical nonmetallic tubing and electrical metallic tubing." The code also states "The following types of raceways shall be supported within one (1) foot of electrical control cabinets, liquidtight flexible conduit, flexible metallic conduit and flexible metal conduit."

The purpose of these strict supporting requirements is a safety measure to insure the raceway will not separate from its connection point, losing continuity of the raceway system and losing an effective equipment grounding path; which is necessary to protect machine operator/operators against possible electrical shock or even electrocution.

Various means and methods have existed in prior arts for supporting conduit. Tehen Et. Al., U.S. Pat. No. 4,259,542 teaches a poke-through electrical fitting, and Beaton U.S. Pat. No. 858,140 teaches hangers for gas pipes, which has a slot for adjustment. What ever the precise merits, features and advantages of the above cited references, none of these achieve or fulfills the purpose of the conduit support bracket the present invention.

Currently within industry electricians are called upon to install and relocate existing machinery within industrial work places. Each time a machine is relocated, or a new machine is installed it will require electrical power for its operation. Within the industrial work areas machines and other equipment are usually set in open bay areas with no structural members close by for supporting electrical raceways. Normally the only structural members available is the high bay steel located approximately twenty (20') above the finished floor. This poses a difficult situation for the electrician because he does not currently have a simple means of meeting the supporting requirements of the 1990 National Electrical Code, article 346-12, Exception No. 2 which states; "The distance between supports shall be permitted to be increased to twenty (20') feet for exposed vertical risers from industrial machinery provided that the conduit is firmly supported at the top and bottom of the riser, and no other means of intermediate support is readily available." Often times the requirement exists for electricians to install two vertical raceways to one electrical control cabinet of the machine. The two raceways may be the same trade size diameter, example $\frac{1}{2}''$ and $\frac{1}{2}''$, or they may consist of two different diameters, example $\frac{1}{2}''$ and $4''$, often these two raceway combinations mentioned will be of different types, of conduit.

An example being rigid metal conduit, the other being flexible metal conduit both of which have different supporting requirements as outlined in the National Electrical Code. Another situation frequently encountered by an electrician is installing two raceways to industrial machine control cabinets with one raceway being vertical and the other being horizontal both of which will have to be supported.

Currently in industry there does not exist any known vertical raceway support bracket capable of being bolted directly to a machine control cabinet and having the versatility of securing one or two vertical raceways to the support bracket or a combination of one horizontal and one vertical raceway, and further accommodate and support the various types of rigid metal conduit rigid nonmetallic conduit, intermediate metal conduit, liquidtight flexible conduit, flexible metallic conduit, flexible metal conduit, electrical nonmetallic tubing, and electrical metallic tubing and sizes $\frac{1}{2}''$, $\frac{3}{4}''$, $1''$, $1\frac{1}{4}''$, $1\frac{1}{2}''$, $2''$, $2\frac{1}{2}''$, $3''$, $3\frac{1}{2}''$, and $4''$ diameter trade size raceway in a rigid and secure manner as required by the 1990 National Electrical Code.

Since there does not exist a support bracket for this purpose, most electricians do not meet the code requirements in these installation of vertical raceway supports. Sometimes a conscientious electrician will manufacture a support at the job site in accordance with other structural members around the equipment of machine, if there are structural members available. Sometimes an electrician will construct a support and secure it to the machine electrical control cabinet.

The fashion and structure of these supports are typically one of a kind. For the electrician to build a support as just described he uses the following method:

1. Purchase material, angle iron or strut.
2. Cut, weld, drill, tap and fabricate together.
3. Attach the support to the control cabinet or structural member.
4. Prime and paint the newly constructed bracket. Painting is a requirement per the 1990 National Electrical Code, to provide corrosion protection.
5. Cutting, welding, drilling, tapping, and painting all require additional skills and complicate the installation time, increasing material, equipment and labor costs.

There is therefore a need to provide a single preformed conduit support bracket which has the capabilities of being bolted directly to a machine electrical control cabinet; is capable of supporting at least two vertical raceways, which may both be the same diameter or comprise of two different diameters; is capable of being field modified (bent) to accommodate at least one horizontal and one vertical raceway; is capable of accommodating trade size raceways ranging in the following diameters ½", ¾", 1", 1¼", 1½", 2", 2½", 3", 3½", and 4", with still a further capability of securing various types of raceways such as rigid metal conduit, rigid nonmetal conduit, intermediate metal conduit, liquid-tight flexible conduit flexible metallic conduit, flexible metal conduit, electrical nonmetallic tubing, and electrical metallic tubing to the support bracket therefore complying with the three (3) and one (1) foot rule as outlined in the 1990 National Electrical Code.

SUMMARY OF THE INVENTION

The principle objective of the present invention is to provide a single means of support for supporting and securing vertical raceways extending from machine cabinets.

It is also an object of the present invention to provide such a means which is of simple, inexpensive construction.

Another object is to provide a single means for quickly and easily attaching the support bracket to the electrical power cabinet.

Another object is to provide a single means capable of supporting any of the following (but not limited to) trade size diameter raceways ½", ¾", 1", 1¼", 1½", 2", 2½", 3", 3½", and 4".

A further objective is to provide a single means of support for raceways that satisfies both the three (3) and one (1) foot support rule as outlined in the 1990 National Electrical Code.

Another objective is to provide a single means of supporting one or two vertical raceways simultaneously extending from electrical power control cabinets.

The final objective is to provide a single means of support that is capable of being field modified to accommodate a combination of one horizontal and one vertical raceway.

These objects as well as other advantages and features of this invention will become apparent from the discussion that follows, and are achieved, according to the present invention.

The raceway support bracket may be produced from a variety of materials. The preferred material being stamped sheet metal, is utilized to support a variety of sizes, and quantities of vertical raceways extending form machine control cabinets. A raceway support bracket made in accordance with the present invention comprises a mounting base and a stanchion post, conduit hole and adjustment slot. The bracket is bent at a specified point to 90 degrees, forming the base and stanchion post. The mounting base consists of four holes pre drilled through the base material, and a conduit hole. The mounting holes are of equal size, which permits bolting the mounting base to a machine control cabinet.

The conduit hole is slightly off center in the mounting base to allow the correct distance between the stanchion post and conduit connector when attached. The conduit hole will accommodate the following (but not limited to) trade sizes diameters of ½", ¾", and 1" raceways. The stanchion post is slotted and so dimensioned in length to allow the use of standard conduit hangers ranging in sizes ½", ¾", 1", 1¼", 1½", 2", 2½", 3", 3½", and 4".

The mounting base is designed so that when a conduit connector is attached to the stanchion, the conduit supported will fit through the hole without any interference be the mounting base material.

These objects as well as other objects, advantages and features will become apparent from the discussion that follows, and are achieved according to the present invention of a conduit support bracket.

DETAILED DESCRIPTION

Figure 1:
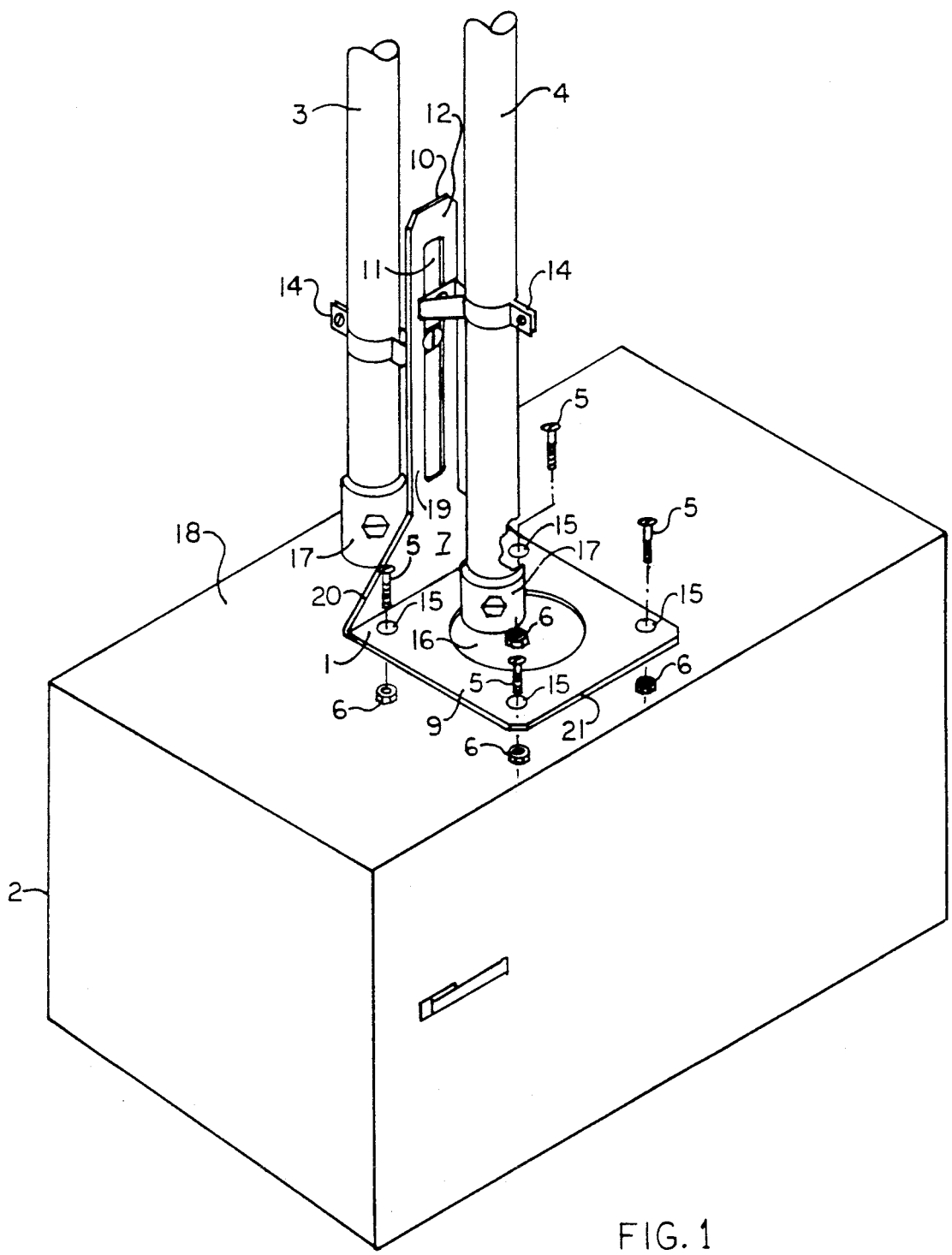
FIG. 1 is a plan view of the conduit support bracket attached to a machine control cabinet and supporting two vertical conduits.

Referring to the drawing, and initially to FIG. 1, there is illustrated a preformed conduit support bracket 1 made in accordance with the present invention being secured to a machine control cabinet 2 and supporting two vertical rigid conduits 3,4. The conduit support bracket 1 may be attached to the machine control cabinet 2 utilizing any variety of means including the illustrated machine bolt 5 and hex nut 6. The conduit support bracket 1 may be made from anyone of a variety of metals including sheet steel or galvanized sheet steel, but is not limited to these materials.

Figure 2:
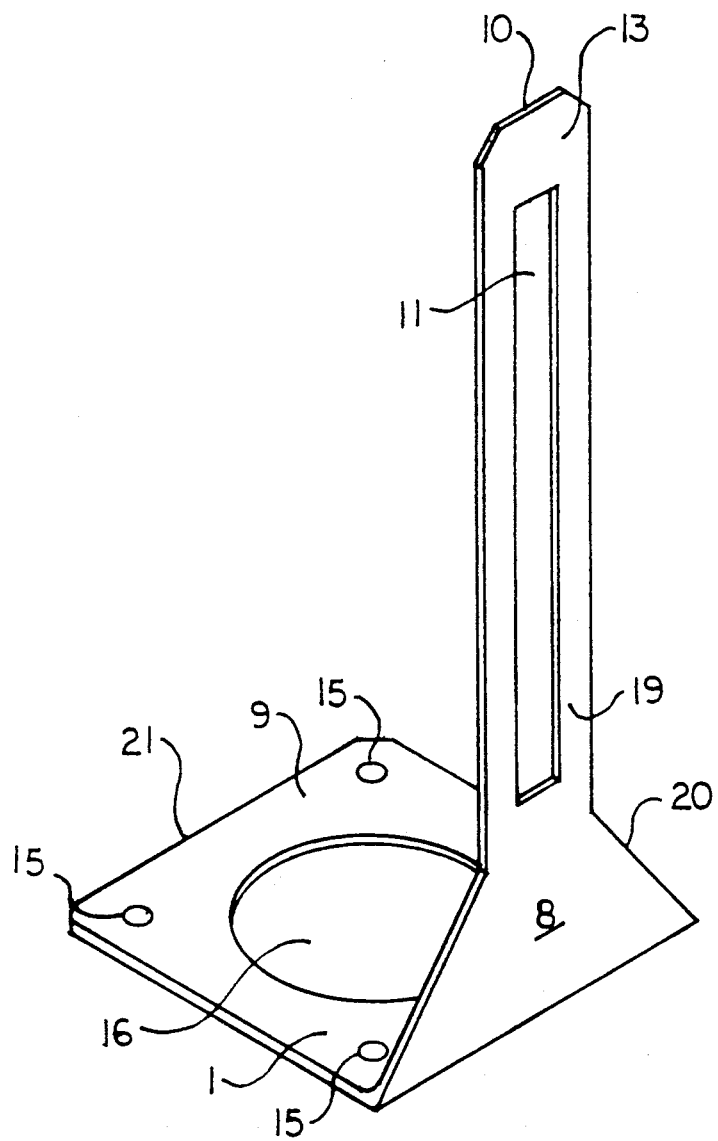
FIG. 2 is a rear plan view of the conduit support bracket.

Referring now also to FIGS. 1-2, the various elements of the conduit support bracket 1 include a front side 7 a rear side 8 a mounting base 9 and a stanchion post 10 with a vertical slot 11 perpendicular to the mounting base 9. The stanchion post 10 is approximately 5" in length and of the same thickness as the mounting base 9. The stanchion post 10 consisting of a front smooth flat mounting surface 12 and a rear smooth flat mounting surface 13. The stanchion post 10 being short in length makes for a very strong preformed conduit support bracket 1 especially after the conduit hanger 14 and conduits 3,4 are installed and secured in place. Also is the fact that the stanchion post 10 being short in length eliminates the need for using heavier gauge metals and larger machinery to punch and form the conduit support bracket 1. Although the stanchion post 10 is short in length, the front smooth flat mounting surface 12 and the rear smooth flat mounting surface 13, shown in FIG. 2 are both capable of supporting any one of the following types of conduits in accordance with the one (1) foot and three (3) foot rule as outlined in the 1990 National Electrical Code. Rigid metal conduit, rigid nonmetallic conduit, intermediate metal conduit, electrical nonmetallic tubing, electrical metallic tubing, liquid tight flexible metal conduit, liquid tight flexible nonmetallic conduit, flexible metallic conduit and flexible metal conduit.

It is believed that this conduit support bracket 1 will also be capable of supporting any new types of conduit not yet appearing within the electrical parts market places, because regardless of the types they will have to be supported using either the one (1) foot or (3) foot rule of the National Electrical Code.

The mounting base 9 consists of a smooth, flat plate approximately 3" square with a minimum thickness of about 0.089, with four (4) equally sized mounting holes 15 and a single larger center hole 16. The four mounting holes 15 allow for bolts 5 to pass through the mounting base 9 and through the machine control cabinet 2. After the nuts 6 are attached to the bolts 5 the conduit support bracket 1 is secured to the machine control cabinet 2. The larger center hole 16 provides for an unprotected passage for a rigid conduit connector 17 to pass completely through the mounting base 9, and flush mate directly to the top of the machine control cabinet 18. Flush mating of the rigid conduit connector 17 is necessary to allow an adequate number of threads on the conduit connector 17 to protrude through the top of the machine control cabinet 18 and allow for installation of a electrical lock nut and bushing. The lock nut secures the rigid conduit connector 17 to the machine control cabinet 2 and the bushing protects the conductors against abrasion. Both the lock nut and the bushing are requirements of the National Electrical Code. If the larger center hole 16 were not incorporated within the mounting base 9 the combined thickness of the mounting base 9 and the machine control cabinet 2 would be greater than the amount of treads available on the rigid conduit connector 17 or any other type of connector making it impossible to attache a lock nut and bushing to the conduit connector 17.

Another feature of the larger center hole 16 is the dimension of about ¼" from the front smooth mounting surface 12 of the stanchion post 10. This clearance allows for the smallest diameter rigid conduit connector 17 which is ½" diameter trade size to be installed within the larger diameter hole 16 and kept far enough away from the front side 7 of the stanchion post 10 to allow for direct alignment of the conduit hanger 14 and the rigid conduit connector 17 therefore eliminating the requirement of bending an offset in the conduit 4.

This clearance is not necessary for the ¾" or the 1" conduit connector because their trade size diameters are larger therefore keeping the rigid conduit connector 17 further away from the front smooth mounting surface 12 of the stanchion post 10 and making alignment of the conduit connector 17 and the conduit hangar 14 automatic.

The mounting base 9 although formed having a continuing outside perimeter, can be field modified by cutting out a small portion of the base metal 24 between any three points of the four mounting holes 15. This will allow for installing the conduit support bracket 1 around a previously installed unsupported conduit without having to disconnect the circuit conductors and removing the conduit 4 from the machine control cabinet 2. The amount of material to be removed from the mounting base will depend upon the existing size of conduit previously installed. What ever the amount of material removed will not jeopardize the strength of function of the conduit support bracket 1.

The front smooth flat mounting surface 12 and the rear smooth flat mounting surface 13 of the stanchion post 10 provides for a smooth vertical mounting surface for a standard conduit hanger 14 which also has the same smooth flat mounting surface.

The stanchion post 10 having a narrower upper portion 19 and is approximately one half the width of the mounting base 9 is capable of being field bent to 90 degrees 23 to accommodate at least one horizontal conduit.

The narrower upper portion 19 of the stanchion post 10 has a vertical slot 11 approximately 3½" in length, and centered on the width of the stanchion post 10.

The vertical slot 11 provides the means for inserting a bolt through the conduit hanger 14 through the vertical slot 11 centered on the stanchion post 10 therefore securing the conduit hanger 14 to the stanchion post 10. To further rigidify and strengthen the stanchion post 10 the lower portion 20 of the stanchion post 10 is tapered approximately 20 degrees.

Figure 3:
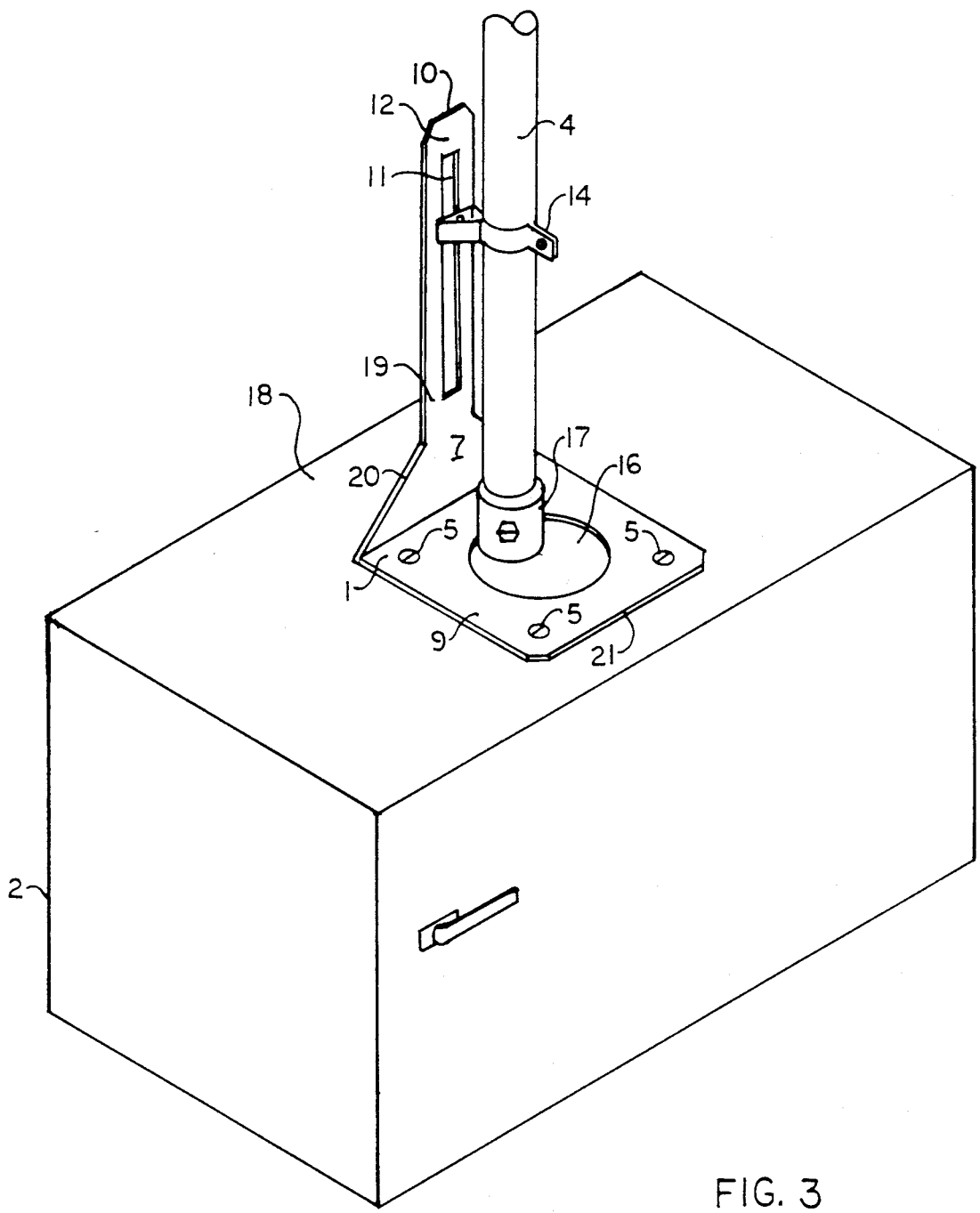
FIG. 3 is a plan view of the conduit support bracket supporting one vertical conduit.

Refer now to FIG. 3 and more specific to the front side 7 of the conduit support bracket 1 of FIG. 3. The single larger hole 16 which has a diameter of approximately two thirds the width of the mounting base 9 is capable of accepting rigid conduit connectors 17 ranging in sizes ½", ¾" and 1" trade size diameters. Also, since rigid conduit connectors 17 have the largest outside diameters of all other conduit connectors the larger center hole 16 will accommodate conduit connectors use for electrical nonmetallic tubing, electrical metallic tubing, liquid tight flexible metal conduit, liquid tight flexible nonmetallic conduit, flexible metallic conduit, and flexible metal conduit.

Referring still to FIG. 3, and specifically to the standard conduit hanger 14 supporting the conduit 4 attached to the front side 7 of the conduit support bracket 1. The vertical position of the standard conduit hanger 14 is going to vary with respect to the size of rigid conduit connectors 17 as well as with any other types of connectors because a larger diameter connector automatically is longer in overall length. To have a better understanding as to how the lengths may vary we offer this example:

A ½" rigid conduit connector is approximately 15/16" long, a ¾" rigid conduit connector is approximately 1" long, and a an 1" conduit connector is approximately 1 3/16" long. These dimensions are approximate and are offered only as examples to help clarify that the vertical slot 11 should not be considered an adjustment slot. It is a vertical slot that will automatically compensate for the varying lengenths of rigid and all other types of conduit connectors. It would not be practical to use pre punched holes in the stanchion post 10 in lieu of the vertical slot 11 because depending on the manufacturer of the various types of conduit connectors the lengths will vary some what therefore not allowing for the conduit hanger 14 to line up with the prepunched hole to allow for securing the conduit hanger 14 to the stanchion post 10.

Referring back to FIGS. 1-2 and specifically to the rigid conduit 3 secured to the rear side 8 of the conduit support bracket 1 in FIG. 1.

As shown in FIG. 2, the rear side 8 of the conduit support bracket 1 is of the same dimension in all respects, and also has a rear flat smooth mounting surface 13.

Since the rear side 8 of the conduit support bracket 1 shown in FIG. 2 does not have a mounting base 9 the range of conduit 3 capable of being supported by conduit support bracket 1 are ½", ¾", 1", 1¼", 1½", 2", 2½", 3", 3½", and 4" trade size diameters. The mounting base 9 as shown in FIG. 1. On the front side 7 of the conduit support bracket 1 and the larger center hole 16 allows for two rigid conduits 3, 4 to be supported simultaneously using only one preformed conduit support bracket 1. Without the larger center hole 16 a first rigid conduit 4 could not be installed and supported because the standard conduit hanger 14 is not long enough to reach from the outermost edge 21 of the mounting base 9 to the front side of the stanchion post 7.

Figure 4:
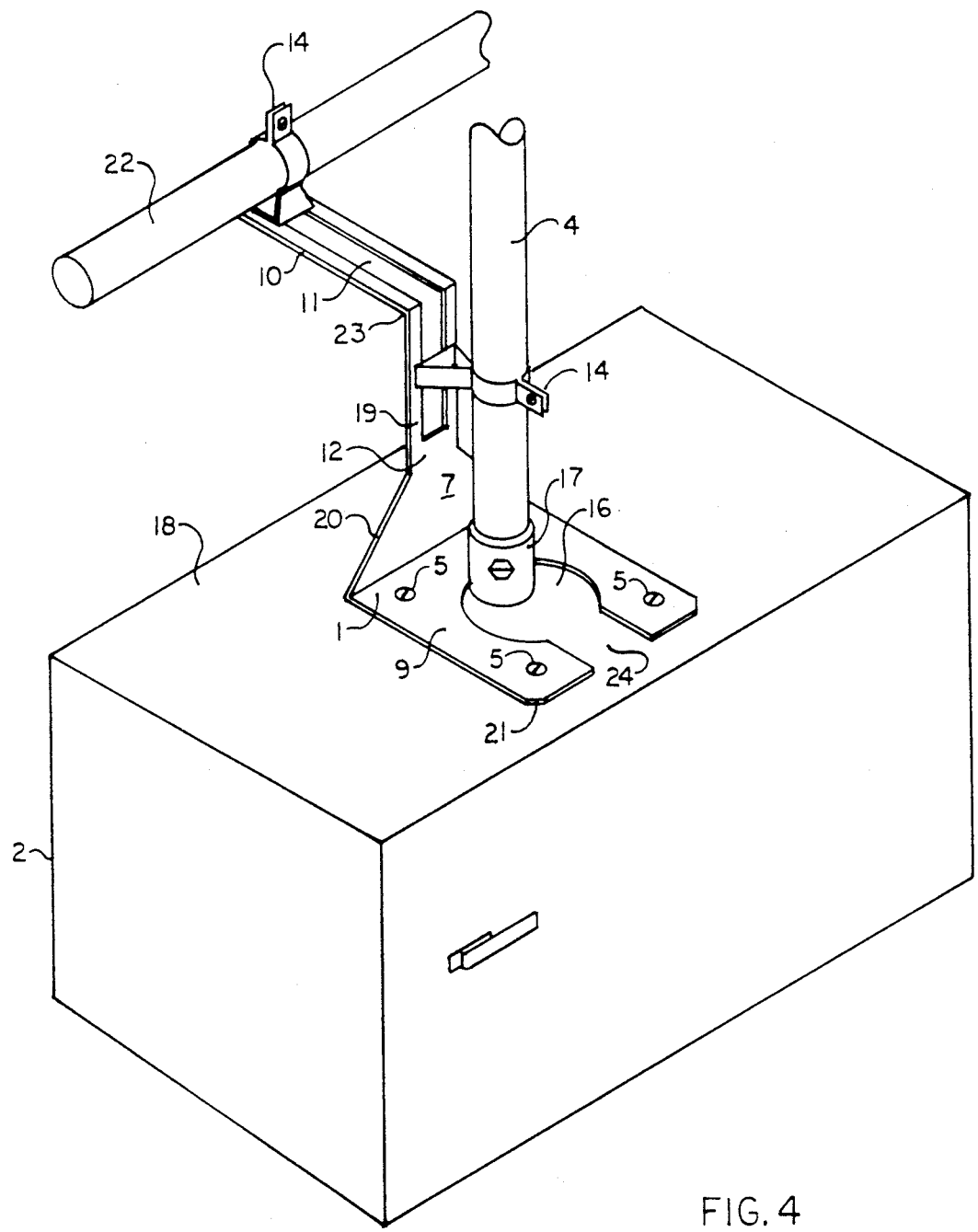
FIG. 4 is a plan view of a field bent conduit support bracket supporting one vertical conduit, and a slot and one horizontal conduit.

With reference to FIG. 4, there is shown the conduit support bracket 1 with one vertical conduit 4 and one horizontal conduit 22 secured to the stanchion post 10 using the standard conduit hanger 14. To accomplish this modification the stanchion post 10 can be field bent to 90 degrees 23 at any point along its narrower upper portion 19.

Although the conduit support bracket 1 has been illustrated above mounted to a machine control cabinet 2 it will be appreciated that the conduit support bracket 1 may easily be mounted to safety switches, wireway or any other variety of electrical devices which provide a smooth mounting surface and are within the design range dimensions of the conduit support bracket 1.

The foregoing description of the preferred embodiment of the inventions been presented for the purposes of illustrating and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A conduit support bracket for supporting two vertical conduits simultaneously, said conduit support bracket comprising, a front side, a rear side, a mounting base, means to secure said mounting base to machine control cabinet, comprising a smooth flat plate with (4) equally sized mounting holes, and a single larger center hole which allows a first conduit to be installed, and a stanchion post perpendicular to said mounting base comprising a lower portion tapered approximately 20 degrees, a narrower upper portion comprising a front smooth, flat, mounting surface and a rear smooth, flat mounting surface, and a vertical slot centered on width of said upper portion, and conduit clamping means for attaching the conduits to the stanchion post.

2. A conduit support bracket as set forth in claim 1, wherein said edge of single larger center hole is about $\frac{1}{4}''$ from the front smooth mounting surface.

3. A conduit support bracket as set forth in claim 1 wherein said single large center hole is capable of accepting rigid conduit connectors ranging in sizes $\frac{1}{2}''$, $\frac{3}{4}''$ and $1''$.

4. A conduit support bracket as set forth in claim 1 wherein said mounting base may be attached to the machine control cabinet using machine bolts and hex nuts.

5. A conduit support bracket as set forth in claim 1 wherein said bracket is formed from galvanized sheet steel.

6. A conduit support bracket as set forth in claim 1 wherein said smooth flat plat is approximately $3''$ square.

7. A conduit support bracket as set forth in claim 6 wherein said smooth flat plate has a minimum thickness of about $0.089''$.

8. A conduit support bracket as set forth in claim 1 wherein said stanchion post is approximately $5''$ in length.

9. A conduit support bracket as set forth in claim 1 wherein said stanchion post is of the same thickness as the mounting base.

10. A conduit support bracket as set forth in claim 1 wherein said narrower upper portion is approximately one half the width of the mounting base.

11. A conduit support bracket as set forth in claim 1 wherein said vertical slot is approximately $3\frac{1}{2}''$ in length.

12. A conduit support bracket as set forth in claim 1 wherein said vertical slot provides the means for securing the conduit clamping means.

13. A conduit support bracket as set forth in claim 1 wherein said front smooth flat mounting surface provides a smooth vertical mounting surface for a standard conduit hanger.

14. A conduit support bracket as set forth in claim 1 wherein said rear smooth flat mounting surface provides a smooth vertical mounting surface for a standard conduit hanger.

* * * * *